United States Patent [19]
Monkelbaan et al.

[11] Patent Number: 5,573,714
[45] Date of Patent: Nov. 12, 1996

[54] SPLICE SUPPORT CONSTRUCTION OF MULTIPLE DOWNCOMER FRACTIONATION TRAY

[75] Inventors: Daniel R. Monkelbaan, Amherst; Michael R. Resetarits, Depew; Lawrence S. Graczyk, Orchard Park, all of N.Y.

[73] Assignee: UOP, Des Plaines, Ill.

[21] Appl. No.: 490,687

[22] Filed: Jun. 15, 1995

[51] Int. Cl.⁶ ........................................ B01F 3/04
[52] U.S. Cl. ........................ 261/114.5; 261/114.1
[58] Field of Search .................... 261/114.5, 114.1

[56] References Cited

U.S. PATENT DOCUMENTS

| | | | |
|---|---|---|---|
| 4,133,852 | 1/1979 | DiNicolantonio et al. | 261/114.5 |
| 4,159,291 | 6/1979 | Bruckert et al. | 261/114.1 |
| 4,174,363 | 11/1979 | Bruckert | 261/114.5 |
| 4,442,048 | 4/1984 | Abernathy et al. | 261/114.5 |
| 5,192,466 | 3/1993 | Binkley | 261/114.1 |
| 5,209,875 | 5/1993 | Miller et al. | 261/114.1 |
| 5,277,847 | 1/1994 | Gentry et al. | 261/114.1 |
| 5,454,989 | 10/1995 | Nutter | 261/114.5 |

*Primary Examiner*—Tim R. Miles
*Attorney, Agent, or Firm*—Thomas K. McBride; John F. Spears, Jr.

[57] ABSTRACT

Fractionation trays are provided with an antipenetration pan which intercepts liquid falling from the downcomer of a vertically superior tray. The antipenetration pans are supported above the surface of the lower tray by brackets attached to the tray decking and to a horizontal deck brace which extends across the tray deck at the location of a joint or splice between adjacent tray deck plates. The invention thereby provides a simple, low cost and easy to install integral antipenetration pan and tray splice construction.

5 Claims, 2 Drawing Sheets

SPLICE SUPPORT CONSTRUCTION OF MULTIPLE DOWNCOMER FRACTIONATION TRAY

FIELD OF THE INVENTION

The subject invention relates to an apparatus useful in vapor-liquid contacting operations as performed in the chemical, petrochemical and refining industries. More particularly the subject invention relates to the design of a tray for use in a fractional distillation column.

BACKGROUND OF THE INVENTION

Fractional distillation finds utility in the separation of many different chemical compounds in a variety of industries. The multiple stages of contacting and separation needed to perform this unit operation can be provided by a number of mechanical arrangements including packing and fractionation trays. When fractionation trays are employed a means must be provided to allow liquid to descend from tray to tray toward the bottom of the fractionation column countercurrent to rising vapor. In some tray designs a portion of the apparatus is dedicated to transporting the liquid downward. These designs typically employ a downcomer which delivers a stream of the liquid to the surface to the next lower tray. This stream may have a significant velocity and momentum which would allow the liquid to overcome the pressure of any vapor attempting to rise through the tray and a portion of the liquid would therefor tend to pass through any available opening where the descending liquid impacts the surface of the next lower tray. For this reason this area is in many instances imperforate and is referred to as the "receiving pan" of the tray.

One particular type of fractionation tray referred to in the art as a multiple downcomer tray does not have such imperforate receiving pans. In this tray design the descending liquid impacts directly upon the perforated surface of the vapor-liquid contacting area decking. This can lead to the undesired passage of liquid through the perforation and an undesired decrease in the tray's separation efficiency. A previously proposed solution to this problem is the provision of antipenetration pans between the liquid outlet at the bottom of the downcomer and the surface of the tray. These devices intercept the descending liquid and prevent the high velocity liquid from impacting onto the surface of the tray thus preventing the bypassing of liquid.

RELATED ART

U.S. Pat. No. 4,159,291 illustrates the fundamentals of multiple downcomer fractionation tray construction including the characteristic arrangement of a plurality of parallel trough like downcomers spread across the surface of the fractionation tray. FIG. 6 of this patent illustrates a traditional transverse arrangement of the downcomers located on vertically adjacent trays.

U.S. Pat. No. 5,209,875 illustrates the use of anti-penetration pans on multiple downcomer fractionation trays. As shown in FIG. 3, the anti-penetration pan may be supported above the surface of a fractionation tray by support arms 12 and the anti-penetration pans may have a side lip 13 to prevent the runoff of liquid into adjacent downcomers.

BRIEF SUMMARY OF THE INVENTION

The invention is a fractional distillation tray having an integral construction of the means used to support liquid antipenetration pans above the surface of the tray with the horizontal braces used to support the perforated decking forming most of the tray surface.

One embodiment of the invention may be characterized as a fractionation tray having an upper first side and a lower second side and which comprises a downcomer which extends across a major horizontal vapor-liquid contacting surface of the tray, which surface is defined by a number of decking plates comprising substantially flat perforated decking material; at least one horizontal support brace extending between the downcomer and another point on the tray, with the support brace being located on the lower second side of the tray; a plurality of antipenetration pans located on the upper first side of the tray, with each antipenetration pan comprising a perforated plate parallel to the major surface of the fractionation tray formed by the decking plates; and a plurality of vertical support members retaining each antipenetration pan a preset distance away from the major surface of the fractionation tray, with support members attached to an upper first side of the tray by a fastener which also attaches the decking plate to the horizontal support brace.

DETAILED DESCRIPTION AND PREFERRED EMBODIMENTS

Figure 1:
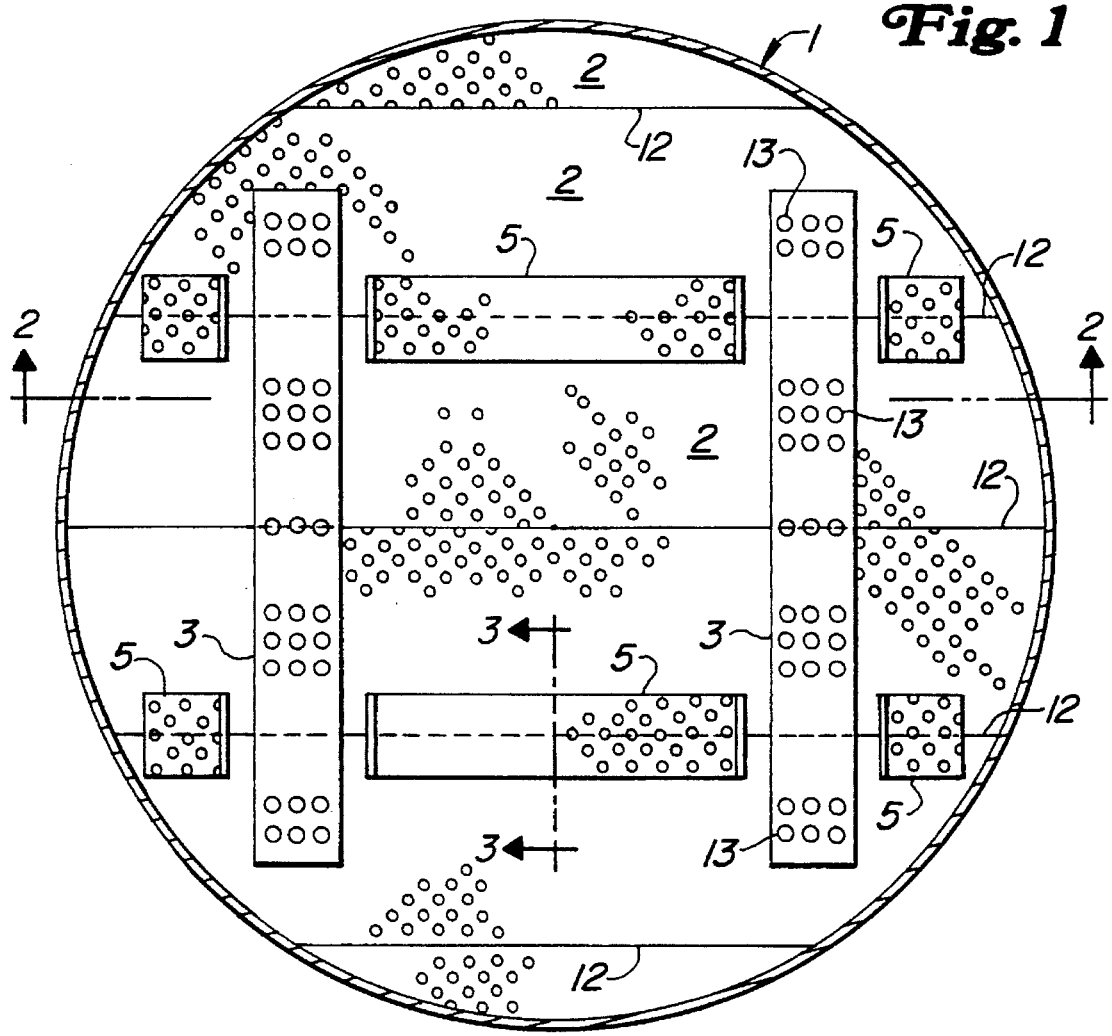
FIG. 1 shows the view looking downward toward a multiple downcomer tray having two parallel downcomers and two multi-part anti-penetration arrays located on the upper surface of the tray.

Multiple downcomer fractionation trays may employ a single downcomer, but typically comprise a large number of parallel trough like downcomers evenly spaced across the surface of the fractionation tray. The structure of these relatively closely spaced downcomers has been found to provide a sufficiently rigid structure to substantially eliminate the need for additional horizontal support elements extending across the column. The decking material located between the downcomers only extends a relatively small distance and is often supported primarily by the downcomers. In some instances, however, the optimum configuration of the multiple downcomer tray calls for a tray to have a relatively small number of the downcomers extending across the tray. With any tray of significant diameter, the result is that the distance between the downcomers becomes relatively long and it is necessary to supply horizontally extending bracing elements to support the decking and prevent it from sagging between the downcomers. An additional problem arises when there is only a limited opening space through which the tray components may be passed into the column during tray construction, repair or replacement. In this situation, the limited diameter of the opening, such as a manway, which is available for the insertion of the tray components into the column requires that each piece of the tray be relatively small in at least two dimensions. The result is that many smaller pieces of decking are employed on the tray and there is a greater need for securing adjacent pieces of deck material to provide a rigid and flat deck surface.

It is an objective of this subject invention to provide an improved multiple downcomer fractionation tray construction for use with small size decking plates. It is a further objective of the subject invention to provide an improved construction for multiple downcomer fractionation trays employing anti-penetration pans. These objectives are achieved by the subject invention in which the support arms employed to suspend the anti-penetration pan above the decking are attached to the decking support brace at the joint between the decking plates resulting in a simple, low cost and very sturdy structure. This structure performs the dual roles of decking plate linkage and support and anti-penetration pan support. In addition, this tray construction results in the location of the anti-penetration pan immediately above the imperforate brace used to support the tray decking. The imperforate support brace normally interferes with the upward passage of vapor through the decking, rendering this location ideal for the placement for the anti-penetration pan.

The subject trays can be fabricated from the same materials customarily used for the construction of fractional distillation trays. Most often this is steel, which may vary from common steel to one of the many stainless steels as required by the corrosiveness of the materials being separated in the column. The subject apparatus can also be fabricated in part or in total from other, more corrosion resistant or lower cost materials such as plastics. The general guidelines used in designing prior art trays of this type can be used to determine the needed size, number, spacing, etc. of the subject trays.

The physical size of any portion of a multiple downcomer tray must be chosen by a skilled designer considering all aspects of the intended operation of the tray. The following are measurement ranges of commercially employed multiple downcomer trays which are presented for the dual purposes of providing guidance in the design and use of the subject apparatus and for distinguishing the multiple downcomer trays of the subject invention from conventional cross-flow fractionation trays. The total open area of the deck material is generally in the range of about 5 to about 15 percent of the deck area. The normal hole diameter of the circular perforations may range from about 0.3 to about 2.6 centimeters (⅛–1.0 inches). A hole size of about 0.47 to about 0.64 centimeters (³⁄₁₆–¼inch) is normally preferred. If slots are employed, the open area provided by slots is preferably from about 0.25 to about 5 percent of the area of the deck. A representative thickness of the decking is about 0.19 centimeters (0.075 inches) to 0.34 cm. The inlet openings of the downcomers are normally about 6 to about 25 cm wide (2.5–10 inches). The height of a downcomer as measured from the horizontal top edge of the outlet weir to the bottom of the liquid sealable means is normally between about 15.2 to about 45.7 centimeters (6–18 inches). This includes the height that the downcomer extends above the decking and below the decking. Tray spacings of 300–500 millimeters are typical for multiple downcomer trays.

The subject apparatus can be used in any instance in which similar vapor-liquid contacting apparatus is employed. The primary usage is the fractional distillation of volatile chemical mixtures. The volatile chemical compounds which can be separated using the subject apparatus include halogenated compounds, organic compounds such as mixtures of two or more aromatic, paraffinic or olefinic hydrocarbons, hydrocarbonaceous fuels and distillates, solvents, alcohols, ethers, and other oxygenates.

Referring now to FIG. 1 there is shown the view as seen looking downward toward a multiple downcomer fractionation tray having two parallel downcomers. When the tray is in use, the major plane of the fractionation tray spacings of 300–500 millimeters are typical for multiple downcomer trays.

Referring now to FIG. 1 there is shown the view as seen looking downward toward a multiple downcomer fractionation tray having two parallel downcomers. When the tray is in use, the major plane of the fractionation tray is horizontal and the perforated decking sections 2 which comprise the great majority of the fractionation tray surface are also horizontal. The decking employed in this tray is in the form of a number of small panels of limited dimension. The largest dimension of the decking panels shown in FIG. 1 is equal to approximately the distance between the two downcomers. The length of the downcomers is equal to the width of at least two decking sections. The result of this configuration is a large number of joints 12 between the adjacent decking plates. These joints may be formed by the deck plates simply abutting one another or they may be in the form of an overlapping "joggle" as described below and shown in FIG. 4.

Another element of the invention which is prominent in FIG. 1 are the six antipenetration pans 5 attached to the upper surface of the tray. The antipenetration pans 5 are located so that they are under the outlets of the downcomers of the next higher tray in the column 1. That is, the antipenetration pans are located under the liquid outlet openings 13 in the bottom of the downcomer of the immediately above fractionation tray. The transverse or perpendicular arrangement of the downcomers on vertically adjacent fractionation trays in the column results in the liquid descending from one downcomer impacting upon the antipenetration pans of the next lower tray. The rectangular antipenetration pans therefore have a major axis perpendicular to the length of the downcomer.

Multiple downcomer or MD fractionation trays have the characteristic feature of not having a receiving pan. A receiving pan is an imperforate portion of the deck surface of the fractionation tray located under a downcomer. The imperforate nature of a traditional receiving pan is intended to prevent liquid descending through the downcomer from passing downward to the next lower fractionation tray. This leakage would allow liquid to bypass the intended fractionation tray and continue downward through the column decreasing the efficiency and performance of the column.

In multiple downcomer trays, the liquid descending from the bottom of a downcomer of the next higher tray normally falls upon a perforated decking section. In some instances, it has been found that the velocity of the descending liquid is sufficient to overcome the upward pressure of vapor through the perforations of the tray deck and liquid will pass through the tray deck onto the next lower tray. This reduces the efficiency of the tray and is therefore undesired. To counteract this tendency, antipenetration pans may be located underneath the openings in the bottom of the downcomer to intercept the descending liquid and reduce its velocity. The use of antipenetration pans is described in the previously referred to U.S. Pat. No. 5,209,875 which is incorporated herein for its teaching in regard the construction and use of antipenetration pans.

Figure 2:
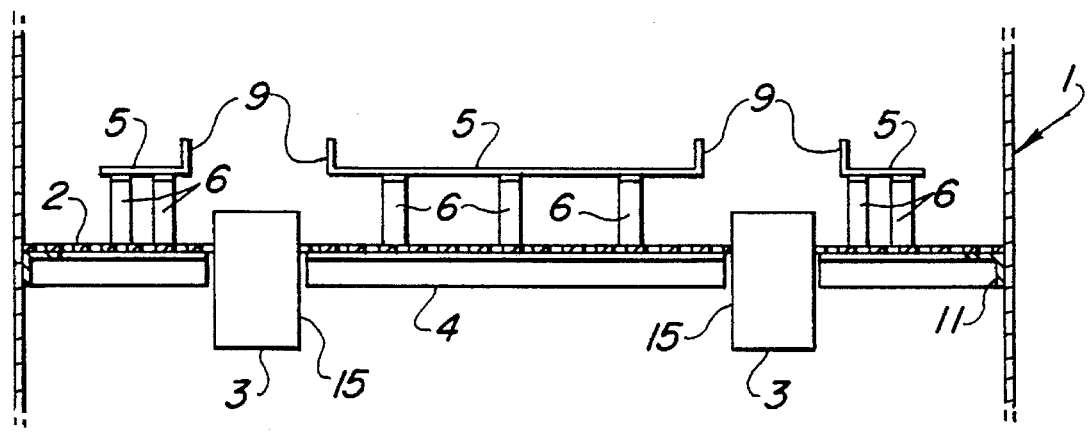
FIG. 2 is a side view through a portion of the normally vertical fractionation column showing the arrangement of the various parts of the invention on a fractionation tray.

The antipenetration pans themselves are constructed of material similar to the decking of the fractionation tray. The pans, however, preferably have a reduced open area (provided by the perforations through the pan) compared to the open area of the decking material. Preferably the open area of the antipenetration pan is provided by openings having a smaller diameter than the openings on the decking of the fractionation tray. A representative size of the openings on the antipenetration pan is from about 0.1 to 0.5 cm. The antipenetration pans therefore typically comprise perforated sheet metal which is bolted to the supports for the antipenetration pan which are in turn fastened to the upper surface of the fractionation tray. The antipenetration pans are approximately equal in width to the downcomers employed on the tray. The antipenetration pans are therefore from about 6 to about 25 cm. wide. A lip formed by an upward or vertical extension of the edge of the antipenetration pan perpendicular to its main surface is preferably located on each end of an antipenetration pan which is adjacent to the inlet to a downcomer. As shown in FIG. 2, the central antipenetration pans therefore have the raised lip 9 at each end and the terminal antipenetration pans have only a single raised lip 9.

FIG. 2 shows a simplified cross-section of a portion of a fractionation column 1. This view illustrates how the fractionation tray is held in place in the column by a circular lip 7 which is bolted or welded to the inner surface of the fractionation column. The L-shaped lip 7 may extend in a circle around the entire circumference of the column with the edge portions of the fractionation tray resting upon its lip. The edge portions of the tray are preferably fastened to this lip as by bolts or other removable fasteners. This Figure also illustrates the preferred rectangular cross-section of the downcomers 3. The preferred construction of the downcomers comprises two parallel sidewalls 15 joined together by two smaller end walls and a bottom or seal plate. These walls are assembled into box-like assemblies of substantial rigidity which normally function as structural members capable of supporting the weight of the fractionation tray and any liquid which rests upon it while it is in use.

This view of the apparatus also clearly illustrates how the antipenetration pans 5 are suspended above the horizontal upper surface of the fractionation tray formed by the decking plates 2 by the upward extending support members or arms 6. A more detailed view of the preferred construction of the support arms 6 is provided in FIG. 3. A horizontal deck brace 4 extends between the downcomers 3 and provides a rigid support intended to prevent the decking from flexing or sagging. The deck brace preferably has an L-shaped cross-section which provides rigidity sufficient to support the decking and associated liquid. The lip also functions to provide a seal which prevents liquid or vapor passage at the edge of the tray.

Figure 3:
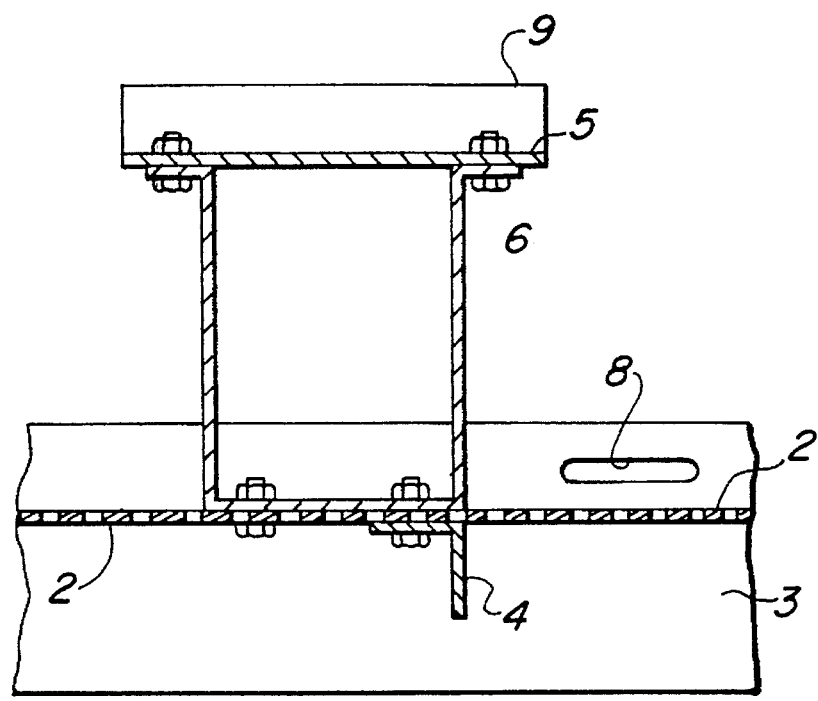
FIG. 3 presents an enlargement of a small portion of the fractionation tray of FIGS. 1 and 2 showing the detail of the assemblage of the support bracket 6 and deck brace 4.

FIG. 3 is an enlarged view of a portion of a fractionation tray taken along a section line looking toward one of the sidewalls of the downcomer 3. This figure illustrates how the sidewall of the downcomer extends through the major horizontal plane of the fractionation tray as defined by the deck plates 2 with a first portion of the sidewall being located above the decking and a major second portion being located below the decking. An opening 8 may be provided in the portion of the sidewall which extends above the tray to allow liquid to flow into the downcomer before the liquid accumulates to a substantial level on the tray. This device has been found useful in operating the apparatus.

As shown in this view, the antipenetration pan 5 has a vertical lip 9 which extends upward from the surface of the antipenetration pan, a distance equal to about 2 to 5 cm. The antipenetration pan itself is fastened by bolts not shown to an upper portion of the U-shaped support bracket 6, with the bottom of the support bracket in turn being bolted to the decking plates 2. One of the bolts used to attach the support bracket 6 to the tray extends through the deck and also fastens the deck section 2 to the horizontal deck brace 4. In this way the amount of equipment and the time required to assemble the apparatus is minimized. The result of this construction is an integral design which reduces the cost of the tray and is believed to yield an incremental improvement in tray performance.

Figure 4:
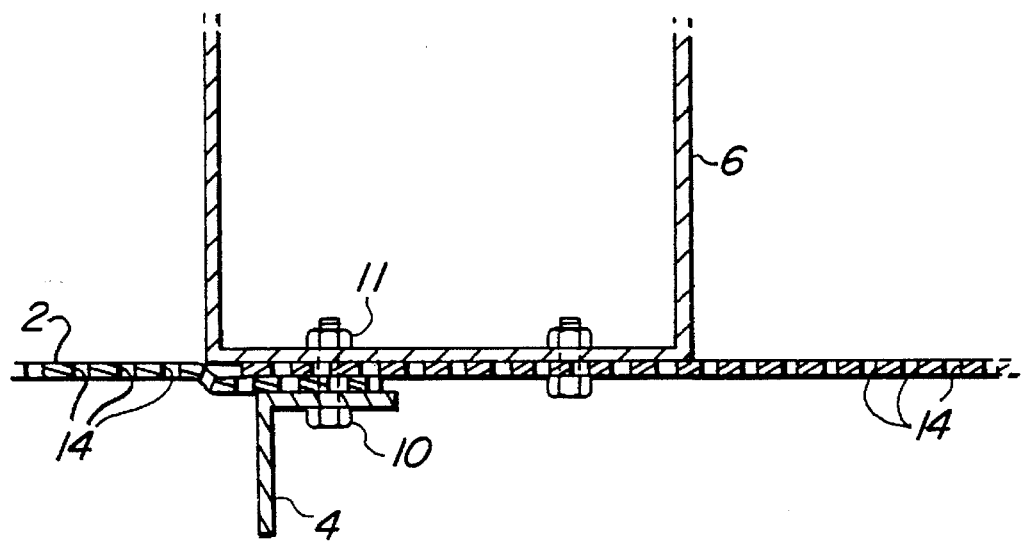
FIG. 4 is a further enlargement showing the manner in which the deck brace 4 is connected to the deck sections 2 and support brace 6 for an alternative embodiment of the invention having overlapping decking sections.

FIG. 4 is a further enlargement of the portion of the overall tray at which the support brace 6 is joined to the tray and to the horizontal deck brace 4. This figure illustrates the preferred L-shaped structure of the deck brace 4 and its attachment to two overlapping deck plates 2. This overlap of the two deckplates is referred to as a "joggle", and the simple abutting joint of two plates is referred to as a "splice". The combination of the support bracket and this joint are referred to as an integral deck splice. It is apparent from the Figure that the deck brace 4 closes off some of the perforations 14 in the deck plates. It is believed that this location of the deck brace underneath the antipenetration pan improves the performance of the tray perhaps by acting as a "secondary" antipenetration pan. This construction has the further advantage of securing the edges of two adjoining deck plates so that they cannot move apart and provide undesirable bypassing of liquid or vapor around the vapor-liquid contacting. This can result from horizontal plate movement or plate distortion (flexing) which causes a plate to bend or bow vertically thereby providing a fluid passage.

The mechanical structure of the support brackets 6 can vary considerably. While a unitary (one-piece) bracket having two legs is preferred, the brackets can be in the form of individual brackets or legs with four or more of these being individually fastened to each anti-penetration pan. That is, a separate pan be supported by either two unitary two legged brackets or four single legged brackets. A bracket would normally be formed out of a two inch wide metal strip. The direction of the bends at the ends of the brackets is not critical.

One embodiment of the invention may be characterized as a fractionation tray which comprises at least two parallel, spaced apart downcomers; a number of decking plates comprising substantially flat perforated decking material, with the decking plates forming a vapor-liquid contacting surface of the tray, with at least some of the decking plates being at least partially located between the downcomers; a horizontal support brace extending between adjacent downcomers; a plurality of vertical support members having a first end attached to an upper surface of the tray by a fastening means which also holds decking plates to the horizontal support brace; and planar antipenetration pans attached to a second end of the vertical support members, with the antipenetration pans comprising a perforated plate parallel to the surface of the fractionation tray formed by the decking plates.

A preferred embodiment of the apparatus of the invention may be characterized as a fractional distillation tray comprising at least two trough-like downcomers, with each downcomer comprising two parallel sidewalls which extend from a point on a first side of the tray to a point on the second side of the tray, with the downcomers being parallel and spaced apart on the tray; a number of decking plates comprising substantially flat perforated decking material, with the decking plates forming a vapor-liquid contacting surface of the tray, with at least some of the decking plates being located between the downcomers; a plurality of horizontal support braces extending between adjacent downcomers; a U-shaped support member having a terminal portion attached to an upper surface of the tray by a fastener which also attaches decking plates to the horizontal support braces; and, an antipenetration pan attached to a central portion of the U-shaped support member, with the antipenetration pan comprising a perforated plate parallel to the surface of the fractionation tray formed by the decking plates.

What is claimed:

1. A fractionation tray having an upper first side and a lower second side and which comprises:
   a. a downcomer which extends across a major horizontal vapor-liquid contacting surface of the tray, which surface is defined by a number of decking plates comprising substantially flat perforated decking material;
   b. at least one horizontal support brace extending between the downcomer and another point on the tray, with the support brace being located on the lower second side of the tray;
   c. a plurality of antipenetration pans located on the upper first side of the tray, with each antipenetration pan comprising a perforated plate parallel to the major surface of the fractionation tray formed by the decking plates; and,
   d. a plurality of vertical support members retaining each antipenetration pan a preset distance away from the major surface of the fractionation tray, with support members attached to an upper first side of the tray by a fastener which also attaches the decking plate to the horizontal support brace.

2. A fractionation tray which comprises:
   a. at least two parallel, spaced apart downcomers;
   b. a number of decking plates comprising substantially flat perforated decking material, with the decking plates forming a vapor-liquid contacting surface of the tray, with at least some of the decking plates being at least partially located between the downcomers;
   c. a horizontal support brace extending between adjacent downcomers;
   d. a plurality of vertical support members having a first end attached to an upper surface of the tray by a fastening means which also holds decking plates to the horizontal support brace; and,
   e. planar antipenetration pans attached to a second end of the vertical support members, with the antipenetration pans comprising a perforated plate parallel to the surface of the fractionation tray formed by the decking plates.

3. The tray of claim 2 wherein the downcomer has a rectangular cross-section.

4. The tray of claim 2 wherein the antipenetration pans have a major axis aligned perpendicular to the length of the downcomers.

5. A fractional distillation tray comprising:
   a. at least two trough-like downcomers, with each downcomer comprising two parallel sidewalls which extend from a point on a first side of the tray to a point on the second side of the tray, with the downcomers being parallel and spaced apart on the tray;
   b. a number of decking plates comprising substantially flat perforated decking material, with the decking plates forming a vapor-liquid contacting surface of the tray, and with at least some of the decking plates being located between the downcomers;
   c. a plurality of horizontal support braces extending between adjacent downcomers;
   d. a U-shaped support member having a terminal portion attached to an upper surface of the tray by a fastener which also attaches decking plates to the horizontal support braces; and,
   e. an antipenetration pan attached to a central portion of the U-shaped support member, with the antipenetration pan comprising a perforated plate parallel to the surface of the fractionation tray formed by the decking plates.

* * * * *